(12) United States Patent
Loce et al.

(10) Patent No.: US 8,934,145 B2
(45) Date of Patent: Jan. 13, 2015

(54) SYSTEM AND METHOD OF IMAGE EDGE GROWTH CONTROL

(75) Inventors: Robert P. Loce, Webster, NY (US); Edgar Bernal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1040 days.

(21) Appl. No.: 12/420,941

(22) Filed: Apr. 9, 2009

(65) Prior Publication Data

US 2010/0259795 A1 Oct. 14, 2010

(51) Int. Cl.
*H04N 1/409* (2006.01)
*G06K 9/44* (2006.01)
*G06K 9/40* (2006.01)
*G03G 15/08* (2006.01)

(52) U.S. Cl.
CPC .................................... *G06K 9/44* (2013.01)
USPC ............ 358/3.27; 358/1.9; 358/2.1; 382/274; 399/27

(58) Field of Classification Search
None
See application file for complete search history.

(56) References Cited

U.S. PATENT DOCUMENTS

| 4,612,540 A * | 9/1986 | Pratt ............................... 345/690 |
| 6,775,410 B1 | 8/2004 | Loce et al. |
| 7,586,650 B2 * | 9/2009 | Washio ........................ 358/3.15 |
| 2004/0136570 A1* | 7/2004 | Ullman et al. ................ 382/114 |
| 2006/0285764 A1* | 12/2006 | Xu et al. ....................... 382/258 |
| 2007/0172141 A1* | 7/2007 | Bando .......................... 382/261 |
| 2009/0097869 A1* | 4/2009 | Kono et al. ..................... 399/27 |

OTHER PUBLICATIONS

J. Gaskill, "Linear Systems, Fourier Transforms, and Optics", 1978, John Wiley & Sons, Inc., pp. 40-43.*

* cited by examiner

*Primary Examiner* — Steven Kau
(74) *Attorney, Agent, or Firm* — Fay Sharpe LLP

(57) ABSTRACT

Systems and methods of controlling the width of one or more image objects in a digital image are provided which determine if one or more image objects include a line or an edge. If the image includes a line, it is processed using a line width control algorithm to modify its width. If the image includes an edge, it is processed using an edge growth control module which processes it differently than a line to modify the edge in the image object.

8 Claims, 5 Drawing Sheets

SYSTEM AND METHOD OF IMAGE EDGE GROWTH CONTROL

BACKGROUND

Disclosed in embodiments herein are methods and systems for improving the quality of image rendering in digital printing systems and more particularly to image processing which differentiates between lines and edges of thicker lines and other image objects, and processes them differently in corresponding line width control and edge growth control operations for improved rendering.

Many images include relatively thin line image objects. For example, some characters of text are considered to be made up of thin lines and curves. Additionally, many business forms include lines and grids for separating portions of a document. It is desirable to be able to adjust images in order to enhance or improve their appearance. For instance, it may be desirable to adjust the thickness of lines in an image. For example, one way to adjust the darkness or lightness or enhance the contrast of a document being printed or photocopied is to adjust the thickness of lines.

Additionally, it may be desirable to adjust the thickness of lines in an image in order to compensate for a drift or imperfection in an image rendering system. For instance, an ink or toner may spread or be absorbed by a print media more or less readily than anticipated. If an ink spreads more readily than an ideal or anticipated amount, then, for example, a white line or feature printed on a black, gray or colored background, might appear thinner than desired or may be completely filled in by spreading colorant from neighboring portions of an image. If an ink or toner or other colorant spreads less readily than anticipated, then a black, gray or colored line may appear thinner than desired. By adjusting a digital representation of the image or selected image objects of the image to be larger or thicker than originally called for, it is possible to compensate for such variations in colorant and print media behavior.

Moving an edge or modifying a line width may also be performed to change features in an image, such as lengthening typographic serifs, and sharpening corners, as taught by U.S. Pat. No. 6,775,410, entitled "Image Processing Method for Sharpening Corners of Text and Line Art," by R. Loce, et al., and US Publication No. US20050129328A1, entitled "Corner Sharpening Of Text And Line Art In A Super Resolution Anti-Aliasing Image Path", by E. Saber, et al., which are hereby incorporated herein by reference in their entirety.

Some current line width control (LWC) operations, such as those taught by US 2006/0285764 A1, "Model-Based Line Width Control," B. Xu, R. Loce, S. Schweid, which is hereby incorporated by reference herein in its entirety, can be used to determine if a line is detected within one or more of the pixel group windows for processing to achieve a desired effect. The range of controllable lines is limited by the size of the observation window. What is needed is a low complexity real-time method for modifying the growth of edges of thicker lines that can operate with an affordable window size.

Digital "halftoning" refers to encoding methods that are used to reduce the number of quantization levels per pixel in a digital image, while maintaining the gray appearance of the image at normal viewing distance. Halftoning is widely employed in the printing and displaying of digital images. The need for halftoning encoding arises either because the physical processes involved are binary in nature or the processes have been restricted to binary operation for reasons of cost, speed, memory or stability in the presence of process fluctuations. Examples of such processes are most printing presses, ink jet printers, binary cathode ray tube (CRT) displays, and laser xerography. In most printing and displaying applications, the halftoned image is composed ideally of two gray levels, black and white. Spatial integration, plus higher level processing performed by the human visual system, of local area coverage of black and white pixels, provides the appearance of a gray level, or "continuous tone", image. Many halftone techniques readily extend to color and to quantization using more than two levels.

Line width adjustment is also performed in halftone printing systems. Many consumers have indicated a greater preference for halftone print quality than for the quality of printed line art. Efforts are therefore being made to further reduce noise and instability of halftones using optimized marking process parameters. These same parameters can affect printed widths of lines, and also affect the printed widths differently based on the digital width of the line. It is therefore desirable to control lines of different widths by different amounts using methods other than marking process parameters.

BRIEF DESCRIPTION

Systems and methods of controlling the width of one or more image objects in a digital image are provided.

The method includes a) selecting a target pixel having a pixel value in a digital image, b) forming one or more pixel group windows, each pixel group window including the target pixel, c) determining whether an edge is detected within the one or more pixel group windows, d) if an edge is detected, modeling a one-dimensional density distribution of the edge and determining distribution parameters, e) adjusting the distribution parameters, f) generating a new pixel value for the target pixel based on area-sampling of the adjusted distribution for producing a modified edge in the image object, and g) repeating steps a)-f) for a plurality of pixels forming the one or more image objects in the digital image.

The method can further include step c) further including determining whether a line is detected within the one or more pixel group windows and step d) further including if a line is detected, processing the image object with a Line Width Control algorithm producing a modified line in the image object and if an edge is detected and a line is not detected, modeling a one-dimensional density distribution of the edge, and determining distribution parameters.

A digital image processing system having a line width control module for processing image objects having lines is provided, the image processing system including an edge growth control module selecting a target pixel having a pixel value in a digital image, forming one or more pixel group windows, each pixel group window including the target pixel, determining whether a line or an edge is detected within the one or more pixel group windows, if a line is detected, processing the image object with the line width control module producing a modified line in the digital image, if an edge is detected and a line is not detected, the edge growth control module modeling a one-dimensional density distribution of the edge, determining distribution parameters, adjusting the distribution parameters, and generating a new pixel value for the target pixel based on area-sampling of the adjusted distribution for producing a modified edge in the digital image.

A digital printer including an edge growth control module selecting a target pixel having a pixel value in a digital image, forming one or more pixel group windows, each pixel group window including the target pixel, determining whether an edge is detected within the one or more pixel group windows, if an edge is detected the edge growth control module modeling a one-dimensional density distribution of the edge, determining distribution parameters, adjusting the distribution parameters, and generating a new pixel value for the target pixel based on area-sampling of the adjusted distribution for producing a modified edge in the digital image.

DETAILED DESCRIPTION

Figure 1:
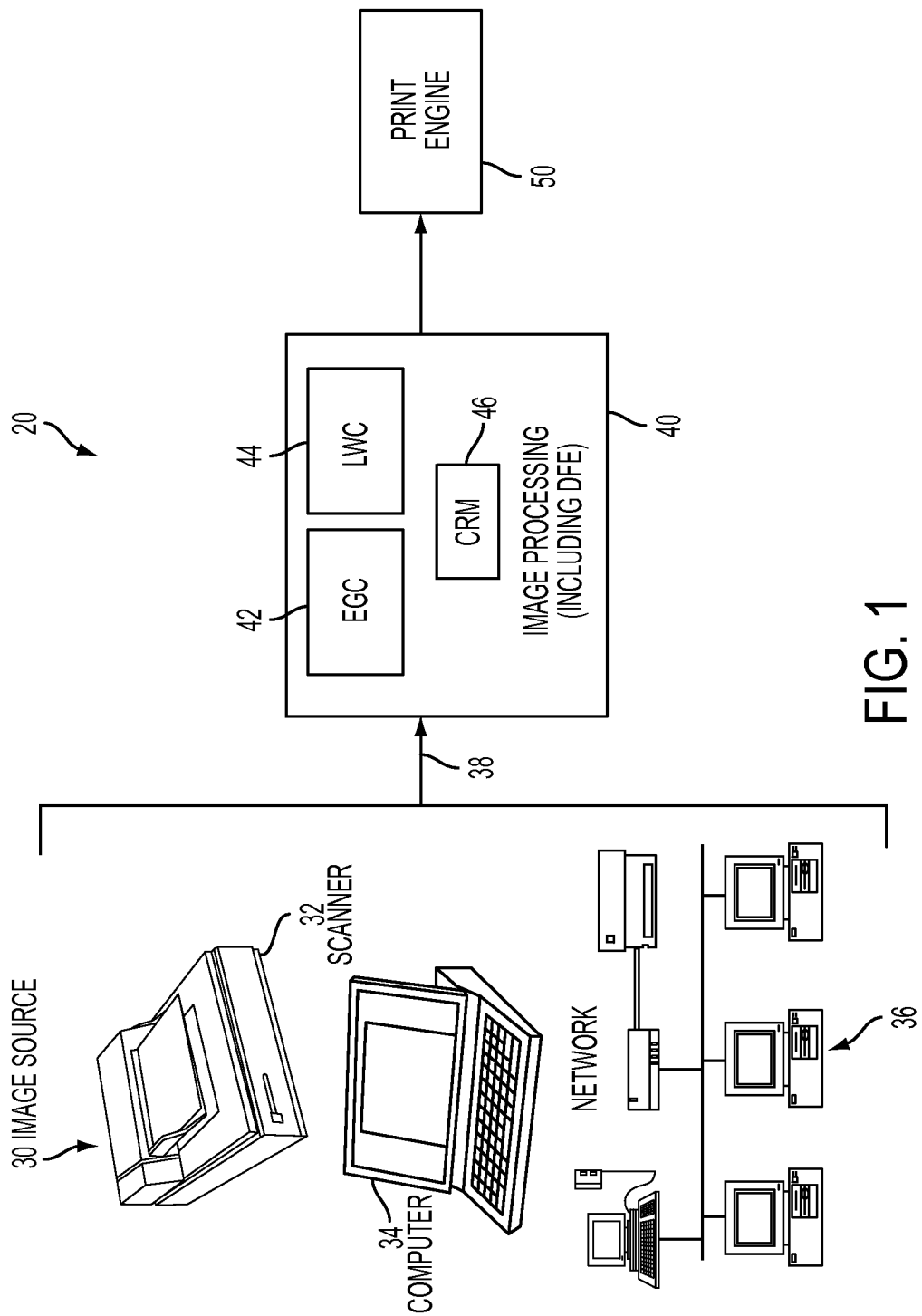
FIG. 1 is a block diagram of an exemplary embodiment of systems for processing image data including a generalized schematic of the edge growth control and line width control modules described herein.

It is to be understood that the disclosure of the following embodiments describes a digital data technique which provides controllable growth of edges in digital images to produce a desired printed appearance. For a general understanding of the present disclosure, reference is made to the drawings. In the drawings, like reference numerals have been used throughout to designate identical elements. In describing the present disclosure, the following term(s) have been used in the description.

The term "data" refers herein to physical signals that indicate or include information. An "image", as a pattern of physical light or a collection of data representing said physical light, may include characters, words, and text as well as other features such as graphics. A "digital image" is by extension an image represented by a collection of digital data. An image may be divided into "segments," each of which is itself an image. A segment of an image may be of any size up to and including the whole image. The term "image object" or "object" refers herein to identifiable structures within an image, such as a typographic character, symbol, graphical object, line art, or defined segment of an image.

In a digital image composed of data representing physical light, each element of data may be called a "pixel," which is common usage in the art. Each pixel has a location and value. Each pixel value can be a bit in a "binary form" of an image, a gray scale value in a "gray scale form" of an image, or a set of color space coordinates in a "color coordinate form" of an image, the binary form, gray scale form, and color coordinate form each can be described by a two-dimensional array defining an image. Although described herein as continuous tone processing, the present systems and methods apply equally as well to the processing of color images, wherein each separation is treated, effectively, as a gray scale or continuous tone image. Accordingly, references herein to the processing of continuous tone (contone) or gray scale images is intended to include the processing of color image separations as well. An operation performs "image processing" when it operates on an item of data that relates to part of an image.

Referring now to FIG. 1, depicted therein is an embodiment of a preferred digital imaging system shown generally at 20. In the system 20, image source 30 is used to generate digital image data 38 that is supplied to an image processing system 40 that may incorporate what is known in the art as a Digital Front End (DFE). The image source 30 may include scanner 32, computer 34, network 36, digital camera or other similar or equivalent image producing machine capable of generating the digital image data 38.

The image processing system 40 includes an Edge Growth Control (EGC) module 42 and a Line Width Control (LWC) module 44 as described in further detail below. The term module can refer to a logic process capable of being performed by one or more of the computers in the digital image processing system, it can also refer to one or more computational processors performing the associated logic as described in further detail below.

The image processing system 40 can also include one or more rendering modules, such as for example a Contone Rendering Module (CRM) 46. The rendering module(s) 44 perform rendering operations which can include halftoning, Anti-Alias Rendering (AAR), and others, that typically convert contone pixel values to binary or high addressable values that drive printed image forming devices 50, such as print engines including xerographic print engines, ink jet print heads, etc. The image processing system 40 and print engine 50 can be included in a digital printer.

The systems and methods disclosed herein are directed towards aspects of the image processing system 40 and more specifically the Edge Growth Control module 42. In particular, the intention of the teachings presented herein includes determining whether a line or an edge is detected in a digital image and processing it accordingly, using respective line growth or edge growth operations for improved image rendering. It will be appreciated by those skilled in the art that the rendering of an image into a printable or displayable output format may be accomplished at any of a number of locations, which herein is provided for by example only as occurring within the image processing system 40, or within the print engine 50.

The line width modification operation(s) described herein are referred to as Line Width Control (LWC) operation(s). A LWC operation is used here to generally refer to an image processing operation that moves the position of at least one side of a line that possesses width in a particular range in an image within a digital image field. Examples of LWC operations can include a line widening effect achieved when moving one or both sides of a line inward or outward.

Alternatively, thicker, more complex image objects such as graphic features and text can undergo Edge Growth Control (EGC) operation(s) by having one or more edges moved inward or outward. The sides of thicker lines, having a predetermined width or thickness, are referred to herein as edges and are preferably modified using an EGC operation that is different than a LWC operation.

In accordance with the embodiments described herein, the distinction between a line and an edge, which may include one or both sides of a thicker line, is defined by the largest line that requires a unique growth value. Specifically, let $\{W_1, W_2, \ldots, W_n\}$ be line widths such that $W_i < W_j$ if $i < j$ requiring growths $\{G_1, G_2, \ldots, G_n\}$ respectively. If $\exists m > 0$ such that $G_i = G_j$ for all $i, j > m$, then the edges of every line with width greater than or equal to $W_m$ can be treated with EGC rather than LWC. That is, the edges of every line with width greater than or equal to $W_m$ can simply be thought of as edges, while the edges of narrow lines must be considered as part of a line having width in a particular range.

All narrow lines requiring unique growth are modified using a line width method of a LWC operation, and lines of greater width (edges) of image objects are modified using the edge growth method of the EGC operation described herein.

For example, model-based LWC processes lines up to width W and defines lines with width greater than W pixels as an edge. W typically ranges between 2 and 4 pixels, though other example embodiments can use other ranges. A distribution test is used to determine whether a line or an edge is being viewed within an observation window, and a preferred window configuration for making these determinations is described. In some embodiments, edges of all lines can be treated as edges. Hence, all processing can be performed using EGC, and LWC would not be needed.

Figure 2:
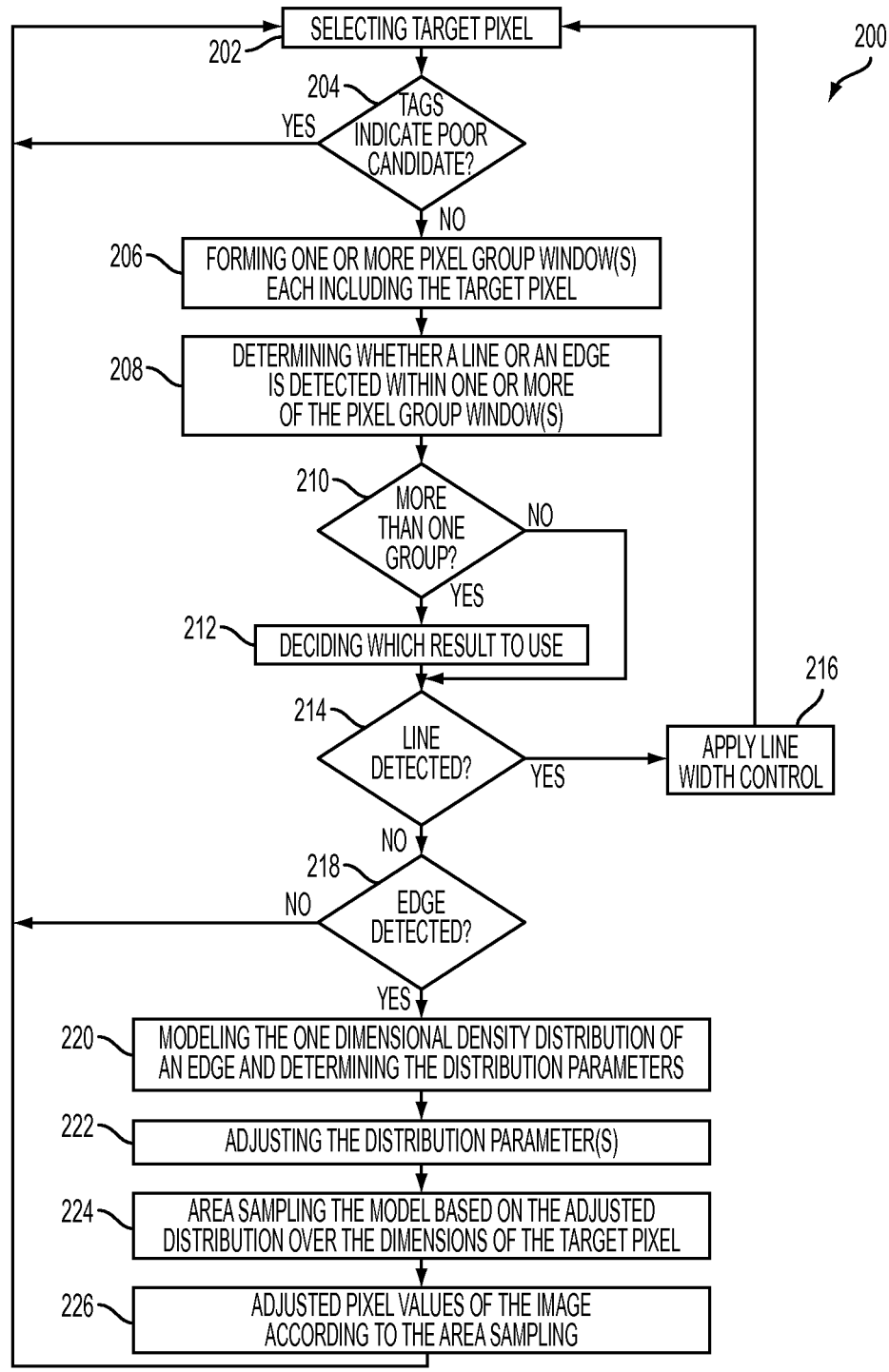
FIG. 2 is a flow chart illustrating an embodiment of the systems and methods of edge growth control and line width control disclosed herein.

Referring now to FIG. 2, a method for performing controllable growth of digital edges in a digital image for improving the visual quality of printed images is shown at 200. The method is an efficient edge growth algorithm for wide lines that works in conjunction with an LWC operation for narrow lines.

The method 200 includes selecting a target pixel in a digital image for processing at 202. An entire image, or only portions of an image, may be processed by selecting different target pixels in the image, as described below.

LWC and EGC operations are typically best suited for images containing line art, curves, circles, text, and other similar objects; whereas, images containing pictures, or like structure, typically make poor candidates for these operations. Metadata, in the form of pixel tags, is often associated with pixels to provide information useful in rendering operations. Pixel tags can be supplied by Digital Front Ends (DFE) used in image authoring or in image rasterization (RIPing), and may be provided in association with one or more image pixels, such as in tag planes, or in other known manners.

The information provided by pixel tags can be used at 204 in determining if the target pixel is a good candidate, or a poor candidate, for LWC or EGC. For example, a pixel tag may indicate that a pixel is associated with a pictorial image, such as a photograph, and if the pixel tag information indicates the pixel is a poor candidate at 204, another image pixel can be selected at 202. If the pixel tag information does indicate that the target pixel is a good candidate for LWC or EGC, such as by indicating the pixel is associated with text, line art, etc., or no pixel tag information is available, processing of the target pixel proceeds.

The method 200 further includes at 206 processing image data 38 forming one or more groups of pixel values, referred to as pixel group window(s) $PGW_1$-$PGW_n$ (where n≥1). Each pixel group window to be processed includes the target pixel and pixels near the target pixel, referred to as neighbor pixels. The pixel group windows $PGW_1$-$PGW_n$ can contain different neighbor pixels, though some neighbor pixels can be included in more than one window. As different target pixels are selected for processing an image region, the one or more windows $PGW_1$-$PGW_n$ are moved over the image so that they all continue to contain the current target pixel being processed.

Figure 3:
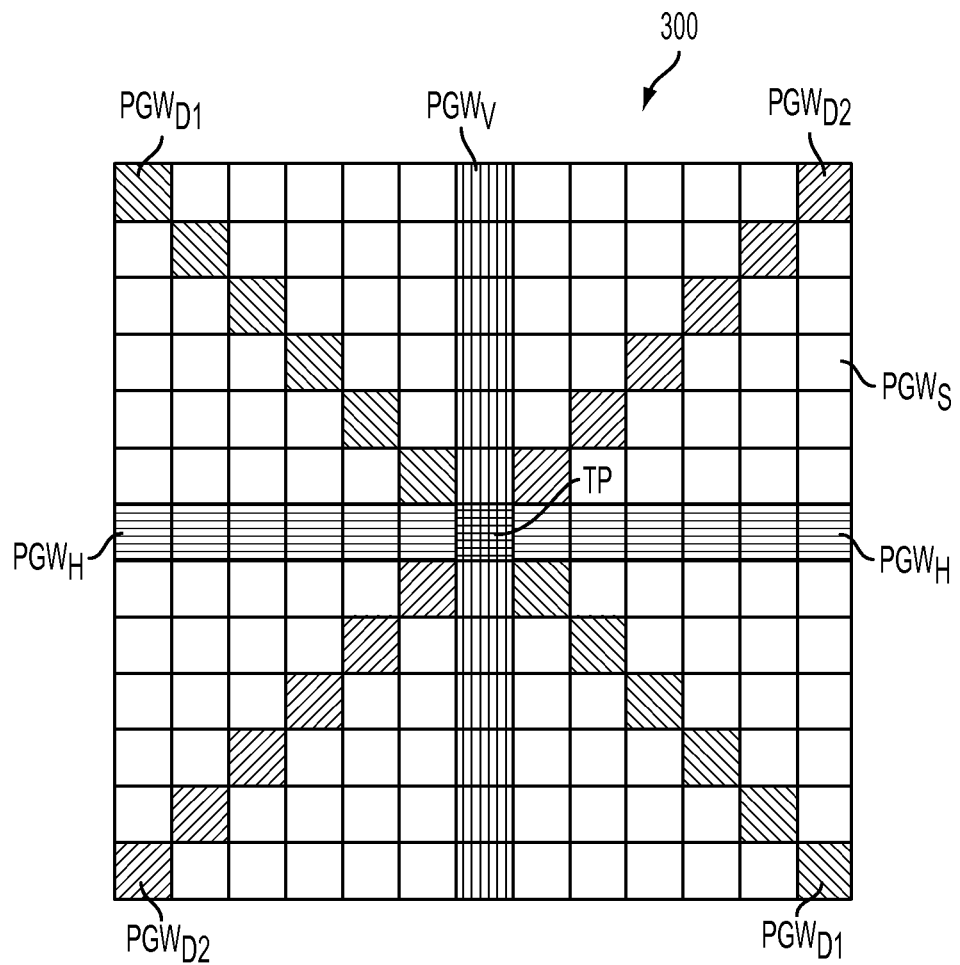
FIG. 3 illustrates several pixel group windows used for processing pixel group data about a target pixel as describe herein.

Referring now to FIG. 3, an example of a digital image region containing a target pixel TP and surrounding neighbor pixels is shown at 300. Four 13×1 vector pixel group windows, and a 13×13 pixel group window are shown, each including the target pixel TP. The 13×1 vector windows are positioned on the vertical, horizontal, and diagonal lines that cross the TP. These include a vertical window $PGW_V$ including 6 neighbor pixels at least approximately vertically aligned above and below TP, a horizontal $PGW_H$ including 6 neighbor pixels at least approximately horizontally aligned to the left and to the right of TP, and two diagonal windows $PGW_{D1}$ & $PGW_{D2}$ crossing at the target pixel TP are also used as shown. One or more two-dimensional pixel group windows can also be used. By way of example, a square 13×13 pixel window PGWs is shown, having TP at its center. The pixel group windows can be processed independently for each TP, if so desired.

Referring again to FIG. 2, the method 200 further includes determining, at 208, whether a line or an edge is detected within one or more of the pixel group window(s). The line detection determination can be optional, if so desired. A line can be detected if it is determined that a window is crossing a line. An edge can be detected if it is determined that a window crosses, or is located in the vicinity, of an edge. Different testing techniques can be used on the pixel values within the windows for this determination.

For example, a LWC algorithm is based on the method of US 2006/0285764 A1, "Model-Based Line Width Control," B. Xu, R. Loce, S. Schweid, which is hereby incorporated by reference herein in its entirety, can be used to determine if a line is detected within one or more of the pixel group windows. Windows larger than those used in this reference were used to enable recognition of edges of wider lines as edges. The window size(s) can be selected to meet the goals of a particular application.

Pixel tags can also be used in the determining step 208. Pixels in the pixel group windows having tags identifying them as belonging to a line can be used to indicate the detection of a line. Tags identifying a pixel as part of text or background/foreground could be used to indicate the detection of an edge. Using pixel tags in this manner, it is contemplated that a single pixel group window may be used. The single window can be a 2-dimensional window, a non-limiting example of which may be $PGW_s$.

Another example of a way of determining that a line is detected within the one or more pixel group windows at 208 can include a line detection test including counting the number of pixels in a certain gray level range within a window, such as for example the 13×13 window $PGW_S$. If the count is above a threshold it can be determined that window is not centered on line art suitable for adjustment, that is to say that neither a line or an edge is detected at 208.

An example of determining that a line is not detected includes checking the range of gray values in the windows, either the vector windows, $W_V$, $W_H$, $W_{D1}$ & $W_{D2}$, or a 2-dimensional window, such as $W_s$. If the range, i.e. the difference between a maximum pixel value and a minimum pixel value within the considered windows, is below a threshold gray value it can be determined that the window or windows are not centered on line art suitable for adjustment, that is to say that neither a line or an edge is detected at 208.

Another example of determining whether a line or an edge is detected within the one or more pixel group windows at 208 includes checking for single peaks in a window. Within each of the vector windows, $PGW_V$, $PGW_H$, $PGW_{D1}$ & $PGW_{D2}$, there should only be one maximum value for dark lines or one minimum value for white lines in a compact distribution with flat tails. One method of testing for a single peak could examine the variance of pixel values within a window. A high variance indicates that the values in the window are spread out and do not form a line suitable for modification, thus no line is detected at 208.

Another example used in the determining step 208 includes checking the pixel values at the ends of the windows. If the pixel values at both ends are low and there is a high peak in the central portion of the window then the pattern in the window can be determined to be a positive line at 208. If the pixel values at both ends of the window are high and there is a low pixel value peak in the central portion of the window then the pattern in the window can be determined to be a negative line at 208.

Another example used in the determining step 208 includes evaluating differences between nearest neighbor pixels in the windows. A line can be determined to be detected at 208 if one plus-to-minus, or minus-to-plus sign change in nearest neighbor pixel value differences along the window are detected.

If, as shown at 210, more than one pixel group window is processed for the line/edge determination(s) of 208, several results may be obtained, and a decision as to which result to use is made at 212. If a line and an edge are found in the window(s) at 208, the priority is given to the line and a LWC operation is performed. Furthermore, the result from the pixel group window having the smallest width line detected at 208 is used because that width most accurately represents what is perceived as the line width. If the smallest detected width is below a width limit imposed by the window size, then the detected area is processed as a line, using with an existing LWC algorithm as described below. If the smallest observed width exceeds the width limit, the area is processed as an edge.

The method 200 further includes at 214 if a line is detected at 208, processing the image with a Line Width Control operation at 216. An example of a LWC operation used at 216 is taught by US 2006/0285764 A1, incorporated by reference above, though others may be used.

If it is determined at 218 that an edge is detected at 208, and no line is detected, processing proceeds to step 220 which includes modeling the one-dimensional density distribution of an edge, and determining the distribution parameters. This step 220 can be done for the pixel data in each pixel group window, or a selected pixel group window, such as for example the pixel group window determined to include the edge.

In step 220, the one-dimensional density distribution of an edge can be modeled as a step function using the Gaskill step function notation, $$\text{step}\left(\frac{x-x_0}{b}\right) = \begin{cases} 0, & \frac{x}{b} < \frac{x_0}{b} \\ \frac{1}{2}, & \frac{x}{b} = \frac{x_0}{b} \\ 1, & \frac{x}{b} > \frac{x_0}{b} \end{cases}.$$

taught in "Linear Systems, Fourier Transforms and Optics," McGraw-Hill, 1996, by J. Gaskill, which is hereby incorporated herein by reference in its entirety. The model resulting in step function:

$$f(x) = a_1 + (a_2 - a_1) \text{ step } [(x-m)/b] \quad (1)$$

where $a_1$ is the level of the white (typically 0 in many printing systems) or gray background ($a_1$>0), $a_2$ is the foreground level, usually 255, representing a saturated edge using 8 bit values (note that $a_2$ could be a different value for systems that use a different number of bits for representing gray levels, but it is assumed herein that $a_2 > a_1$), x is the dimension along the vector window, m is the pixel location of the edge discontinuity (by definition m is the point where the edge has value $(a_1+a_2)/2$), b defines the orientation of the edge: b=1 for edges rising to the right and b=−1 for edges rising to the left. The b parameter can be determined by examining differences between neighboring pixels.

The remaining distribution parameters of the step function are obtained by fitting the expression in Eq. (1) to the pixel values found in a pixel group vector window that contains an edge. A thresholding operation can be used to distinguish between pixels in the background and pixels in the foreground according to their values. $a_1$ and $a_2$ are estimated by calculating the average value of pixels in the background and the foreground respectively and m can be estimated by calculating the (possibly non-integer) pixel position at which the edge has value $(a_1+a_2)/2$.

The thresholding operation can be implemented by using counts in an incremented LUT. Starting with an 8-bit Look-Up Table (LUT) possessing addresses 0-255 and entry values initialized to 0, for each pixel value in the pixel group window, the LUT entry is incremented at the address associated with the gray-level of that pixel. If a LUT entry receives the minimum number of counts (e.g., half of the length of a one-dimensional observation window plus one), that address can be considered to correspond to the gray level of the background. Further detail for this example is taught by US 2006/0285764 A1, incorporated by reference above.

Figure 4:
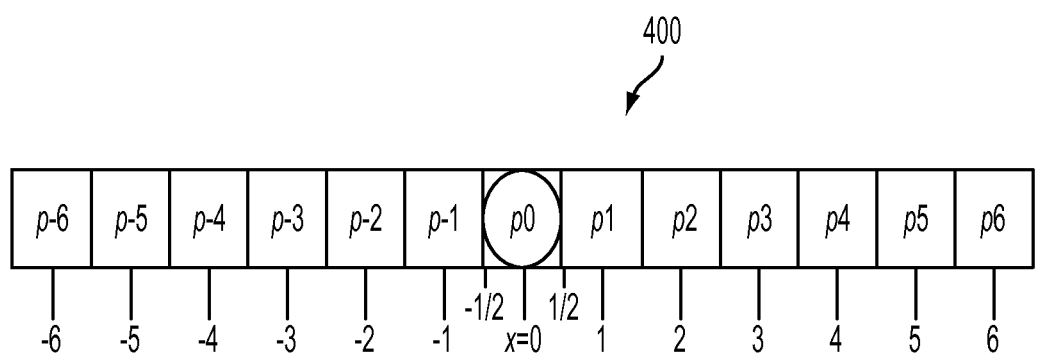
FIG. 4 illustrates a pixel group vector window having edge distribution parameters defined and generated as described herein.

An example of the values associated with a pixel group vector window that can be used to generate these parameters is shown generally at 400 in FIG. 4. The pixel value for the ith pixel is denoted by $p_i$, and $x_i$ denotes its position (center to center) relative to the target pixel $p_0$.

The method 200 further includes adjusting the edge distribution parameters defining the edge position at 222. In modifying the edge position, it is desirable to maintain maximum compactness while moving the location of the edge. This can be accomplished by modeling the edge by the step function of Eq. (1), modifying the transition parameter, and resampling. The transition parameter of the modified edge can be represented as m+δ.

Thus, a modified edge can be represented as:

$$f(x) = a_1 + (a_2 - a_1) \text{ step } [(x-(m+\delta))/b] \quad (2)$$

where, for extension of the dark portion of the edge, δ<0 for b>0, and δ>0 for b<0; and where, for contraction of the dark portion of the edge, δ>0 for b>0, and δ<0 for b<0.

The adjusted distribution is then area sampled at 224 over the dimensions of the support region of the target pixel.

The goal of the operation at a target pixel is the acquisition of a new value for the target pixel $p_0'$ for a suitably modified edge which can be used for adjusting the pixel values of the image at 226. The new value may be obtained by area sampling the model for the distribution of the modified edge.

The output pixel value determined at 226 could be in forms other than 1× gray-scale pixel values. For example, the output pixel value for $p_0'$ could be in binary high addressable form. Integration limits that comprehend the output pixel boundaries can be used along with thresholding to the output quantization.

Figure 5A:
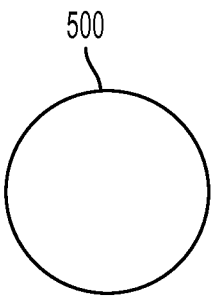
FIGS. 5a-5d illustrates images having narrow lines and images having wide lines that are thickened using the systems and methods described herein.
Figure 5B:
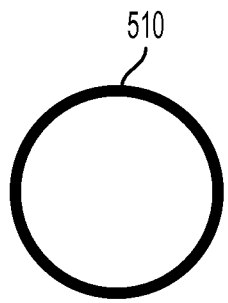
Figure 5C:
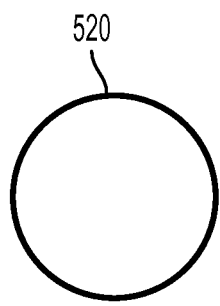
Figure 5D:
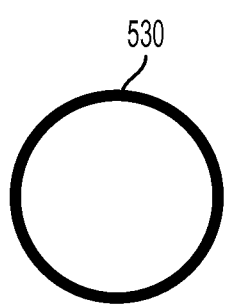

Referring now to FIGS. 5a-5d, further results of using the systems and methods described here are provided. FIG. 5a is an input image of a circle drawn with a single pixel line 500 and FIG. 5b is a circle drawn with a 5 pixel line 510. These input lines are anti-aliased and possess gray edges, which adds to the difficulty of processing these images. After detecting a line in the narrow circle image object shown in FIG. 5a, the systems and methods described herein apply the model-based LWC method of US 2006/0285764 A1, incorporated by reference above, to produce the output image shown in FIG. 5c. After detecting an edge in the wide line circle image object shown in FIG. 5b, the edge growth control produces the output image shown in FIG. 5d. Using approximate digital growth amounts, the 1-pixel line 500 of FIG. 5a is grown by 1.6 pixels (0.8 on each side of the line) as shown at 520, and the 5-pixel line 510 of FIG. 5b is grown as an edge, 0.5 pixels on each side as shown at 530. In this manner, systems and method described herein enable image objects that are determined to lines 500 to be processed with a LWC algorithm and changed by a different amount than image objects determined to be edges (including wider lines 510) which are processed by an EGC algorithm.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of controlling the width of one or more image objects in a digital image using a digital image processor, the method comprising:
   a) selecting a target pixel having a pixel value in a digital image;
   b) forming one or more pixel group windows, each pixel group window including the target pixel;
   c) determining that at least one edge is detected within the one or more pixel group windows;
   d) modeling a one-dimensional density distribution of only one of the at least one edge as a step function and determining distribution parameters;
   e) adjusting the distribution parameters to produce an adjusted density distribution;
   f) an image processor generating a new pixel value for the target pixel based on area-sampling of the adjusted density distribution producing a modified edge in the image object; and
   g) repeating steps a)-f) for a plurality of pixels forming the one or more image objects in the digital image, wherein the forming one or more pixel group windows includes forming one or more pixel group vector windows and the one-dimensional density distribution of only one of the at least one edge is modeled as the step function:

$$f(x)=a_1+(a_2-a_1) \text{ step } [(x-m)/b]$$

where $a_1$ is the level of the white or gray background, $a_2$ is the foreground level, x is the dimension along a vector window, m is the pixel location of the edge discontinuity where the only one of the at least one edge has value $(a_1+a_2)/2$, and b defines the orientation of only one of the at least one edge: b=1 for edges rising to the right and b=−1 for edges rising to the left and wherein the adjusted density distribution of the modified edge can be represented as:

$$f(x)=a_1+(a_2-a_1) \text{ step } [(x-(m+\delta))/b]$$

where, for growth of edges, $\delta<0$ for b>0, and $\delta>0$ for b<0;
   where, for contraction of edges, $\delta>0$ for b>0, and $\delta<0$ for b<0; and
   where $m+\delta$ is a transition parameter.

2. The method of claim 1 wherein the distribution parameters include at least one of position of the one edge, and background level.

3. The method of claim 1 wherein the adjusting the distribution parameters includes adjusting a position of the one edge.

4. The method of claim 1 wherein the adjusting the distribution parameters includes adjusting a line density distribution and the area sampling includes inputting the adjusted distribution parameters into the solution for a definite integral.

5. An apparatus for processing image objects, the apparatus comprising:

an image processor selecting a target pixel having a pixel value in a digital image, forming one or more pixel group windows, each pixel group window including the target pixel, determining that at least one edge is detected within the one or more pixel group windows, modeling a one-dimensional density distribution of only one of the at least one edge, determining distribution parameters, adjusting the distribution parameters to produce an adjusted density distribution, and generating a new pixel value for the target pixel based on area-sampling of the adjusted density distribution for producing a modified edge in the digital image, wherein the image processor forms one or more pixel group windows by forming one or more pixel group vector windows and models the one-dimensional density distribution of the only one of the at least one edge as the step function:

$$f(x)=a_1+(a_2-a_1) \text{ step } [(x-m)/b]$$

where $a_1$ is the level of the white or gray background, $a_2$ is the foreground level, x is the dimension along a vector window, m is the pixel location of the edge discontinuity where the only one of the at least one edge has value $(a_1+a_2)/2$, and b defines the orientation of the only one of the at least one edge: b=1 for edges rising to the right and b=−1 for edges rising to the left and wherein the adjusted density distribution of the modified edge can be represented as:

$$f(x)=a_1+(a_2-a_1) \text{ step } [(x-(m+\delta))/b]$$

where, for growth of edges, $\delta<0$ for b>0, and $\delta>0$ for b<0
where, for contraction of edges, $\delta>0$ for b>0, and $\delta<0$ for b<0
where $m+\delta$ is a transition parameter.

6. The apparatus of claim 5 further comprising:
a line width control module, wherein the image processor determines whether a line or an edge is detected within the one or more pixel group windows, and when a line having a width that is less than a predetermined number of pixels is detected, the line width control module processes the image object having the detected line and produces a modified line in the digital image, and when one edge is detected, the one edge including a line having a width that is greater than a predetermined number of pixels, and a line having a width that is less than the predetermined number of pixels is not detected, the image processor models the one-dimensional density distribution of the only one of the at least one edge.

7. A digital printer comprising:
an image processor selecting a target pixel having a pixel value in a digital image, forming one or more pixel group windows, each pixel group window including the target pixel, determining that at least one edge is detected within the one or more pixel group windows excluding any line having a width that is less than a predetermined number of pixels, modeling a one-dimensional density distribution of only one of the at least one edge, determining distribution parameters, adjusting the distribution parameters to produce an adjusted density distribution, and generating a new pixel value for the target pixel based on area-sampling of the adjusted density distribution for producing a modified edge in the digital image, wherein the image processor forms one or more pixel group windows by forming one or more pixel group vector windows and models the one-dimensional density distribution of the only one of the at least one edge as the step function:

$$f(x)=a_1+(a_2-a_1) \text{ step } [(x-m)/b]$$

where $a_1$ is the level of the white or gray background, $a_2$ is the foreground level, x is the dimension along a vector window, m is the pixel location of the edge discontinuity where the only one of the at least one edge has value $(a_1+a_2)/2$, and b defines the orientation of the only one of the at least one edge: b=1 for edges rising to the right and b=−1 for edges rising to the left and wherein the adjusted density distribution of the modified edge can be represented as:

$$f(x)=a_1+(a_2-a_1) \text{ step } [(x-(m+\delta))/b]$$

where, for growth of edges, $\delta<0$ for b>0, and $\delta>0$ for b where, for contraction of edges, $\delta>0$ for b>0, and $\delta<0$ for b where $m+\delta$ is a transition parameter.

8. The digital printer of claim 7 further comprising:
a line width control module, wherein the image processor determines whether a line or an edge is detected within the one or more pixel group windows, and when a line having a width that is less than a predetermined number of pixels is detected, the line width control module processes the image object having the detected line and produces a modified line in the digital image, and when one edge is detected, the one edge including a line having a width that is greater than the predetermined number of pixels, and a line having a width that is less than the predetermined number of pixels is not detected, the image processor models the one-dimensional density distribution of the only one of the at least edge.

* * * * *